United States Patent [19]

Matuschek

[11] Patent Number: 5,063,838
[45] Date of Patent: Nov. 12, 1991

[54] PORTABLE APPARATUS FOR BREWING HOT BEVERAGES

[75] Inventor: Manfred Matuschek, Solingen, Fed. Rep. of Germany

[73] Assignee: Robert Krups Stiftung & Co. KG, Solingen, Fed. Rep. of Germany

[21] Appl. No.: 574,443

[22] Filed: Aug. 28, 1990

[30] Foreign Application Priority Data

Aug. 29, 1989 [DE] Fed. Rep. of Germany ....... 3928475

[51] Int. Cl.$^5$ ............................................ A47J 31/10
[52] U.S. Cl. ...................................... 99/307; 99/284; 206/216; 426/112
[58] Field of Search .................. 99/279, 300, 304, 305, 99/306, 307, 295, 302 R, 303, 313, 316, 317, 298, 293, 280, 284; 426/433, 112

[56] References Cited

U.S. PATENT DOCUMENTS

| | | | |
|---|---|---|---|
| 4,495,404 | 1/1985 | Carmichael | 99/279 |
| 4,674,400 | 6/1987 | Rondel | 99/279 |
| 4,704,954 | 11/1987 | Mollenhoff | 99/295 |
| 4,765,422 | 8/1988 | Hoffmann | 177/211 |
| 4,888,465 | 12/1989 | Hoffmann | 219/301 |
| 4,888,466 | 12/1989 | Hoffmann | 219/301 |
| 4,888,467 | 12/1989 | Hoffmann | 219/301 |
| 4,920,868 | 5/1990 | Gehrmann | 99/279 |

FOREIGN PATENT DOCUMENTS 7122332  9/1971  Fed. Rep. of Germany .
2305819  8/1973  Fed. Rep. of Germany .
7430108  3/1976  Fed. Rep. of Germany .

Primary Examiner—Robert W. Jenkins
Attorney, Agent, or Firm—Peter K. Kontler

[57] ABSTRACT

A compact portable apparatus for brewing hot coffee, hot tea or another hot beverage has a housing with a first chamber for a supply of liquid to be heated and a filter assembly above the chamber. A cup which can receive, for example, a quantity of hot beverage to fill two standard cups confines the lower portion of the housing when the apparatus is ready for storage but the cup is placed next to the housing and beneath an outlet for hot beverage when the apparatus is to be put to use. The cup and the lower portion of the housing define an annular chamber which receives the convolutions of an electric cable serving to connect an electric heater for liquid in the first chamber with an energy source. A carrier of the filter assembly has a chamber for reception of hot beverage before the latter flows into the cup. The filter assembly has a cover which is detachably connected to the housing to seal a space within a liquid-permeable filter element so that heated liquid which ascends from the first chamber through a riser and enters the space within the filter element is compelled to flow through the filter element and into the chamber of the carrier before it flows into the cup. The filter assembly is located at a level above the cup regardless of whether the cup receives the lower portion of the housing or collects the freshly brewed beverage.

41 Claims, 4 Drawing Sheets

PORTABLE APPARATUS FOR BREWING HOT BEVERAGES

BACKGROUND OF THE INVENTION

The present invention relates to improvements in electrically operated apparatus for making hot beverages, such as coffee, tea or chocolate. More particularly, the invention relates to improvements in relatively small (particularly portable) apparatus which can be taken along on trips or elsewhere and enable the user to rapidly brew relatively small quantities of a hot beverage, e.g., two cups of coffee or tea.

An electrically operated apparatus for brewing hot beverages (hereinafter called apparatus or coffee maker for short) normally comprises a housing which has a chamber for reception of a relatively small quantity of a liquid to be heated, an electric heater for liquid in the chamber, a riser which conveys heated liquid from the chamber into contact with a supply of flavoring agent (such as comminuted coffee beans), and a cup which is used to collect the resulting beverage. It is also known to employ a detachable cup which can be placed next to the housing in order to intercept and collect the hot beverage which issues from an outlet of the housing.

In accordance with an earlier proposal, the cup for collection of freshly brewed hot beverage is located in line with the housing and with a filter for heated liquid (which flows past a supply of flavoring agent and toward the outlet) when the apparatus is ready for storage, e.g., in a suitcase. Such apparatus are relatively long and, in addition, actual brewing of a beverage must be preceded by a large number of steps. Thus, it is necessary to place the apparatus onto a supporting surface (such as a table top or the top of a counter). The next step involves separation of the cup from the housing of the apparatus (e.g., by pulling the cover off the top of the housing) and placing of the separated cup next to the housing so that its opening faces upwardly. The operator then removes the filter from the housing and turns the removed filter through 180° prior to reinsertion into the housing so that the properly inserted filter is located between the housing and the cup. This affords access to a closure for the top of the container for cold water. The closure is lifted and the operator introduces a selected quantity of liquid (to this end, the operator can use the cup). The closure is then returned to its sealing or closing position and the cup is again placed next to the housing. These steps are time-consuming so that the owner often decides against the brewing of coffee. A further drawback of the above described conventional apparatus is that heated liquid which contacts the supply of flavoring agent is not pressurized, i.e., the selected quantity of comminuted coffee beans as well as the heated liquid are maintained at atmospheric pressure. This prolongs the brewing operation, i.e., the beverage merely trickles from the outlet of the housing.

It is further known to provide an electrically operated coffee making apparatus wherein the heated liquid is maintained above atmospheric pressure during contact with a selected quantity of comminuted coffee beans. This reduces the interval of time which is required to brew a selected quantity of hot coffee. However, such coffee makers are not portable in a sense that they can be taken along on trips (e.g., in a small suitcase or in a small bag), i.e., they cannot be rapidly dismantled to be reassembled into a body which is more suitable for transport than the body which is to be assembled preparatory to the brewing of a selected quantity of hot beverage.

German Utility Model No. 7 430 108 of Bosch-Siemens-Hausgeräte GmbH discloses an electric coffee maker wherein a housing defines a chamber for a supply of water and for an electric heater. A riser conveys heated water into a filtering unit which is installed at a level above a removable coffee cup. The position of the cup when the coffee maker is not in use is the same as when the cup is in the process of collecting hot beverage which flows from the filtering unit. Thus, neither the dimensions nor the configuration of the coffee maker are changed preparatory to storage. Moreover, the coffee maker does not have any means for confining the electric cable when the apparatus is not in use.

Published German patent application No. 2 305 819 of Laama et al. discloses a coffee maker wherein a supply of water is heated in a lower container and is compelled to flow upwardly (as a result of heating and attendant generation of steam) through a filtering unit and into a second container above the filtering unit. The second container has an outlet for hot beverage, i.e., it is not a cup or a similar vessel from which the beverage can be sipped by the user so that such person need not carry along or search for a cup from which the beverage can be sipped in the customary way. The electric cable of the coffee maker is fully exposed at all times, and all accessories (such as sugar, comminuted coffee beans and milk) must be stored outside of the coffee maker.

German Utility Model No. 7 122 332 of Johannes Schlenker-Maier Elektrotechnische Fabrik discloses a coffee maker wherein a portion of the electric cable can be confined in the lower portion of an elongated tubular housing. The dimensions of the coffee maker are the same when the apparatus is idle as well as when the apparatus is in actual use.

OBJECTS OF THE INVENTION

An object of the invention is to provide an electrically operated apparatus for brewing hot beverages which can be used for the brewing of small quantities of coffee, tea and/or other hot beverages and, when not in use, can be converted into a compact package which occupies little room in storage or during transport.

Another object of the invention is to provide an apparatus which can be rapidly converted for the making of a selected quantity of hot beverage or for storage in a small area, e.g., in a suitcase or in a bag.

A further object of the invention is to provide an electrically operated apparatus which is constructed and assembled in such a way that the electric cable can be fully or at least nearly fully concealed when the apparatus is not in use.

An additional object of the invention is to provide the above outlined apparatus with a novel and improved filter assembly.

Still another object of the invention is to provide a novel and improved housing for use in the above outlined apparatus.

A further object of the invention is to provide a novel and improved beverage collecting vessel for use in the above outlined apparatus.

An additional object of the invention is to provide an apparatus which is constructed and assembled in such a way that, when in condition for storage, its dimensions are a fraction of the dimensions when ready for use.

Another object of the invention is to provide a novel and improved method of converting an apparatus for brewing small quantities of hot beverages into a small package preparatory to shipment or storage.

A further object of the invention is to provide the apparatus with novel and improved means for confining the electric cable when the apparatus is not in use.

An additional object of the invention is to provide the apparatus with novel and improved means for storing sugar, artificial sweetener, coffee, milk, tea and/or other accessories when the apparatus is not in actual use.

A further object of the invention is to provide the apparatus with novel and improved means for directing freshly brewed coffee, tea or other hot beverage into a collecting vessel.

SUMMARY OF THE INVENTION

The invention is embodied in a portable apparatus for brewing hot beverages, such as coffee, tea or chocolate. The improved apparatus comprises a housing having a liquid-receiving first chamber (e.g., a chamber which can accommodate two cups of cold water or cold milk), and a liquid-permeable filter assembly which serves to confine a supply of flavoring agent (such as comminuted coffee beans, fragments of tea leaves or pulverulent chocolate). The filter assembly is installed in or on the housing and defines a beverage-receiving second chamber having an outlet, and the apparatus further comprises electrically operated means (such as an immersion heater or a heater which employs one or more thick film conductors) for heating the liquid in the first chamber, means (particularly an elongated upright riser) for conveying heated liquid from the first chamber into contact with flavoring agent in the filter assembly and attendant conversion of heated liquid into a hot beverage which gathers in the second chamber, and a vessel (such as a coffee cup or a tea cup) which is movable relative to the housing between a first position in which the housing extends into the vessel and a second position in which the vessel receives hot beverage from the second chamber by way of the outlet. The vessel and the housing jointly define a third chamber in the first position of the vessel, and the apparatus further comprises an electric conductor (e.g., a standard electric cable of the type customarily employed in household appliances) which is connected to the heating means in the housing, which extends from the housing, and which is receivable in the third chamber in the first position of the vessel.

The housing has an upper portion which serves to carry the filter assembly and a lower portion for confinement of the heating means. The lower portion extends into the vessel when the latter is maintained in the first position.

The filter assembly can include a cover (or the cover can constitute a discrete part) and means for separably connecting the cover to the housing. The filter assembly also has a filter element through which the freshly brewed beverage passes on its way into the second chamber and which is disposed between the cover and the housing. The third chamber can constitute an annular chamber and is preferably dimensioned to receive convolutions of the conductor. The convolutions surround the housing and are surrounded by the vessel when the latter assumes the first position.

In accordance with an advantageous and desirable feature of the invention, the filter assembly is disposed at a level above the first chamber in the first as well as in the second position of the vessel with reference to the housing.

The lower portion of the housing can be provided with a first opening and the housing preferably comprises a second opening above the vessel in either position of the vessel. A first portion of the conductor extends into the lower portion of the housing by way of the first opening, and a second portion of the conductor extends outwardly through the second opening. A third portion of such conductor (between the first and second portions) can be convoluted around the lower portion of the housing within the third chamber in the first position of the vessel.

The upper portion of the housing can be provided with first coupling means and the vessel is then provided with second coupling means serving to releasably engage the first coupling means in the first position of the vessel. The upper portion of the housing can include an inner wall and an outer wall which surrounds the inner wall, and the first coupling means is preferably provided on the outer wall.

In accordance with a presently preferred embodiment, the upper portion of the housing has a supporting surface for a carrier which forms part of the filter assembly and supports the aforementioned filter element. The carrier sealingly engages the supporting surface, and the second chamber preferably constitutes an annulus which surrounds the filter element. The open lower end of the riser is located in the first chamber, and the upper end of the riser is preferably located within the filter element. The latter can constitute or resemble a hollow upright cylinder. The carrier can be provided with a sealing element which engages the supporting surface of the upper portion of the housing. The riser extends through the carrier of the filter assembly and the latter further comprises a conduit which receives hot beverage from the second chamber and defines the outlet for introduction of hot beverage into the vessel while the latter assumes its second position. The vessel can be provided with a handle having a plug which extends into the outlet of the filter assembly in the first position of the vessel.

The filter assembly can define a passage which connects the first and second chambers, and the apparatus then further comprises a relief valve which is installed in the passage and serves to permit heated liquid to flow from the first chamber into the second chamber when the pressure in the first chamber exceeds the pressure in the second chamber to a predetermined extent. The relief valve is installed outside of the preferably annular (e.g., upright cylindrical) filter element. The passage is defined by the carrier which is preferably provided with an extension overlapping the passage. The relief valve includes a seat in the carrier, a valving element in the passage, and a valve spring which reacts against the extension and bears upon the valving element to bias the latter against the seat. The pressure in the first chamber must be sufficiently high to lift the valving element off the seat against the opposition of the spring in order to establish a flow of heated liquid and/or steam from the first chamber into the second chamber.

The upper end of the riser can be provided with prongs alternating with slots which define paths for the flow of heated liquid from the first chamber into the second chamber. A cap can be provided to overlie the upper end of the riser and can be separably coupled to the prongs. Alternatively, the upper end of the riser can be overlapped by a sieve.

The upright cylindrical filter element can be provided with at least one window beneath its upper portion and the filter assembly then further comprises a liquid-permeable screen (e.g., a thin foil) which overlaps the at least one window. The carrier of such filter assembly can be provided with an annular recess for the lower portion of the filter element. The cover of the filter assembly overlaps and sealingly engages the upper portion of the cylindrical filter element. A sealing element can be employed to sealingly engage the upper portion of the filter element and to extend into a recess of the cover. It is often preferred to provide the filter element with a plurality of windows and to use a liquid-permeable screen for each window. The screens are or can be of identical size and shape.

The cover and the upper portion of the housing can be provided with mating threads to clamp the filter element between the cover and the housing. The cover can resemble an inverted cup which has a sidewall extending into the upper portion of the housing. The threads preferably include external threads on the sidewall and internal threads in the upper portion of the housing.

The apparatus can further comprise a panel which is provided in the first chamber, preferably immediately or closely adjacent a wall which forms part of the lower portion of the housing and is adjacent the bottom of the first chamber. Sealing means can be interposed between the panel and the wall of the lower portion to prevent escape of liquid from the first chamber into the lower portion of the housing beneath the wall. The heating means (particularly an immersion type electric heater) can be mounted on and is preferably bonded to the panel. The heating means on the panel has electric terminals which extend through the panel and into the lower portion of the housing beneath the aforementioned panel-supporting wall. The latter preferably defines an internal shoulder, and the apparatus then further comprises means for fastening the panel to the lower portion of the housing so as to deform the sealing means into sealing engagement with the panel and with the shoulder and to thus prevent escape of liquid from the first chamber along the shoulder. If the heating means is an electric immersion heater which has an annular shape and is installed in the first chamber, the lower end portion of the riser is preferably surrounded by the annular resistance heater.

The housing can include a hollow base which is located below the lower portion, and annular sealing means between the base and the lower portion. If the electric heating means includes at least one thick film conductor, such conductor can be installed in the base. The lower portion of the housing can at least partially surround the base, and the sealing means can be bonded to the lower portion and to the base. The base and the lower portion of the housing can be provided with confronting substantially annular ribs or beads, and the sealing means is preferably clamped between such ribs.

The underside of the aforementioned panel in the first chamber can carry a thermostat which extends into a space beneath the panel.

The first chamber is or can be made accessible for temporary storage of certain accessories for the preparation of hot beverages. Such accessories can include natural and/or artificial sweeteners, milk, coffee and/or tea. For example, the apparatus can be furnished with a plurality of substantially annular receptacles which are removably installed in the first chamber and surround the riser. Such receptacles can be stacked on top of each other and they can be form-lockingly connected to each other. The arrangement may be such that the receptacles at least partially (preferably at least substantially) fill the first chamber Each of these receptacles can confine a quantity of a different accessory to the making of hot beverages, e.g., a supply of coffee, tea, milk, cocoa powder, chocolate powder, natural sugar and artificial sugar.

Instead of employing annular receptacles, it is equally possible to at least partially fill the first chamber with substantially sector-shaped receptacles which are removably installed in the first chamber so as to at least partially surround the riser. For example, the apparatus can be furnished with three identical sector-shaped receptacles which surround the riser and at least nearly fill the first chamber.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain presently preferred specific embodiments with reference to the accompanying drawing.

BRIEF DESCRIPTION OF THE DRAWING

FIG. 1a is a sectional view of a detail in a modified apparatus;

DESCRIPTION OF PREFERRED EMBODIMENTS

Figure 1:
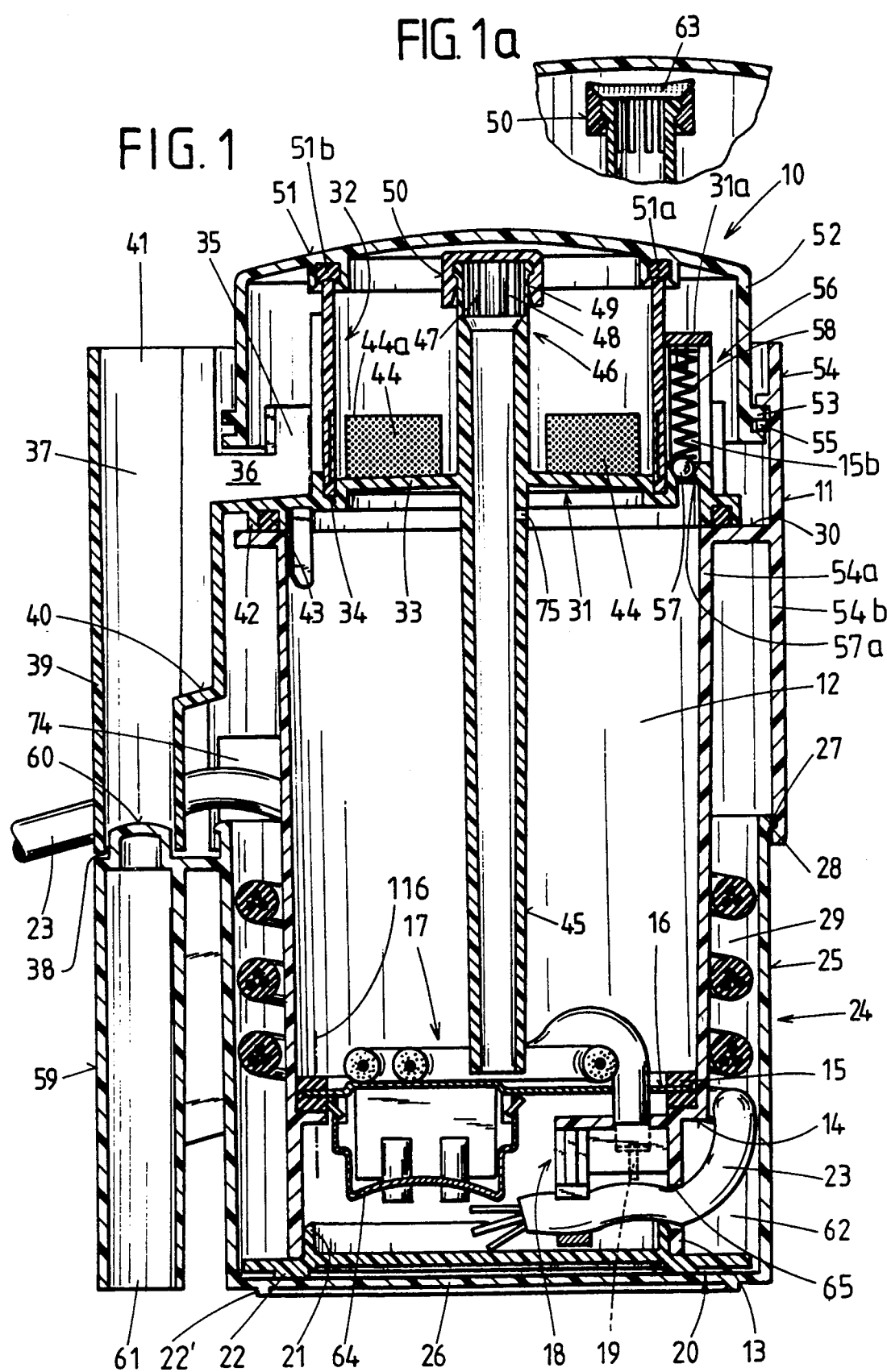
FIG. 1 is a central vertical sectional view of an electrically operated portable apparatus for brewing hot beverages, the vessel being shown in the first position in which the apparatus is ready for storage or shipment.

FIGS. 1 to 4 show certain details of a portable apparatus 10 which embodies one form of the invention and can be used for the brewing of coffee, tea or another hot beverage (hereinafter referred to as coffee for short). The drawing shows only those features of the apparatus 10 which are necessary for a complete understanding of the invention. The parts or groups of parts which are not specifically shown include certain components of the electric circuitry as well as the controls (including pushbuttons, knobs, levers and like parts) which are normally installed in the lower portion 13 of an upright tubular housing 11. Those parts which are not specifically shown are of conventional design and can be found in numerous coffee makers which are available on the market. Reference may be had, for example, to the so-called "Krups 'Coffee Time Plus' Electronic Coffee Maker" which is distributed by the assignee of the present application and to other coffee makers which are shown in the brochure entitled "KRUPS QUALITY BY DESIGN 1990".

The apparatus 10 of FIGS. 1 to 4 comprises the aforementioned housing 11 and a vessel 24 which resembles a coffee cup (hereinafter called cup). In accordance with a feature of the invention, the cup 24 can be moved between a first position (shown in FIG. 1) in which it receives the lower portion 13 of the housing 11 and a second position (FIG. 2) in which the cup 24 is ready to collect freshly brewed coffee issuing from an outlet 38 forming part of a conduit 39 which, in turn, forms part of a composite filter assembly including a carrier 31, a liquid-permeable filter element 30 and a cover 51. When the cup 24 assumes the position of FIG. 1, the apparatus 10 constitutes a relatively small package which can be readily stored in a suitcase or in a bag to be taken along on a trip, on vacation or elsewhere. The bulk of the apparatus 10 is increased when the cup 24 is moved to the position of FIG. 2. All that is necessary to convert the apparatus 10 from the compact package which is shown in FIG. 1 into the coffee maker of FIG. 2 is to pull the lower portion 13 of the housing 11 out of the cup 24, place the bottom portion 11 on a supporting surface (e.g., on the top of a table or a counter), and place the cup 24 next to the lower portion 13 of the housing 11 so that the opening at the top of the cup is below the outlet 38 of the conduit 39.

The housing 11 and the cup 24 can be made of a plastic material of the type customarily employed for the making of housings which are to form part of household appliances. The housing 11 defines an upright annular liquid-receiving (first) chamber 12 which is surrounded in part by the lower portion 13 and in part by the upper portion 54 of the housing. The dimensions of the chamber 12 are selected in such a way that it can receive a relatively small quantity of liquid (e.g., fresh water), for example, a quantity which suffices for the brewing of two cups of coffee. The chamber 12 can be filled to the top or the operator can use the cup 24 for the purpose of pouring two full cups of water into the chamber 12.

Figure 2:
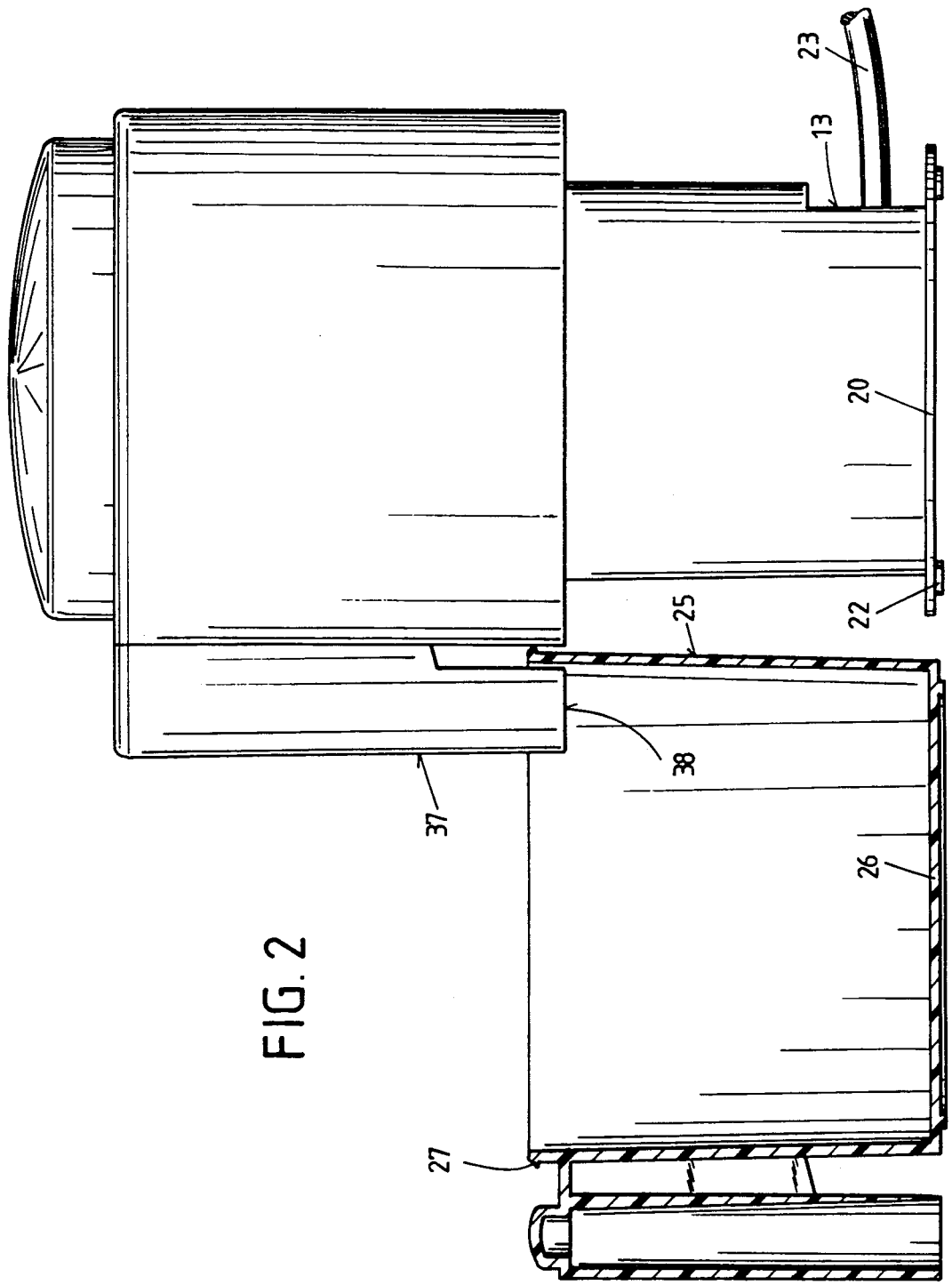
FIG. 2 is a partly elevational and partly central vertical sectional view of the apparatus of FIG. 1, with the vessel shown in its second position in which the apparatus is ready for the brewing of a hot beverage.
Figure 3:
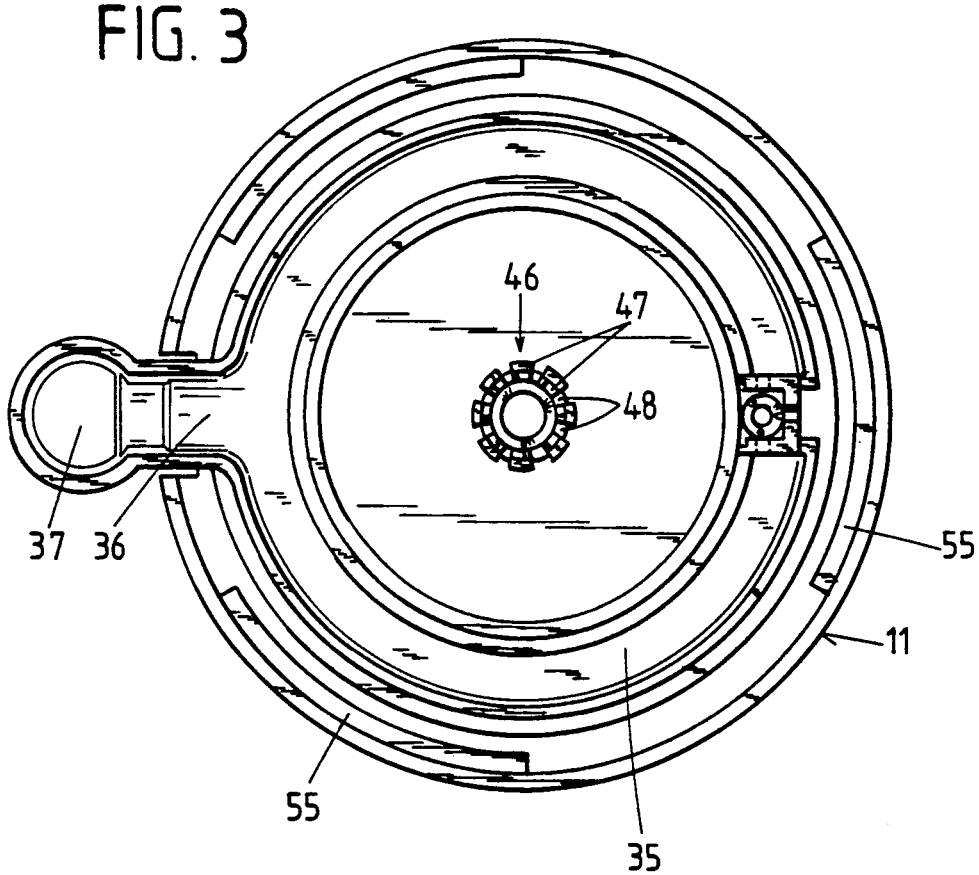
FIG. 3 is a plan view of the apparatus of FIG. 1, with the cover of the filter assembly and the cap for the riser removed.
Figure 4:
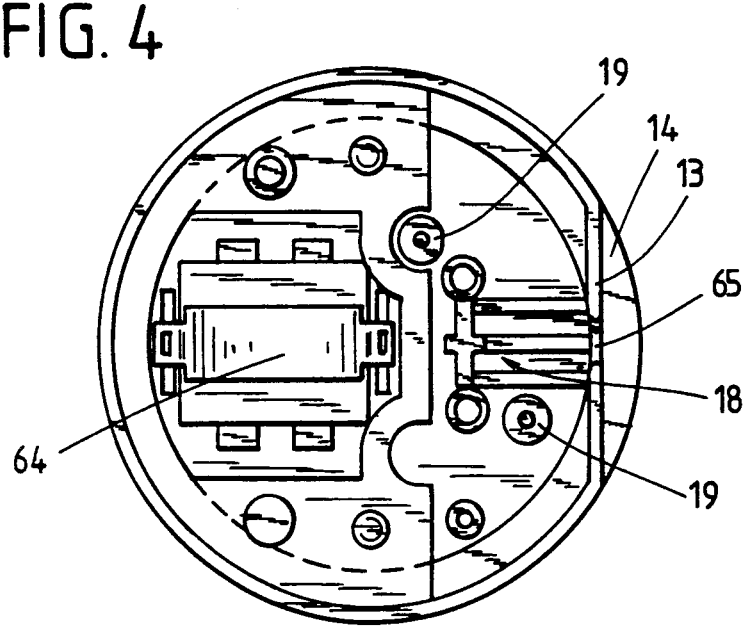
FIG. 4 is a bottom plan view of the apparatus of FIG. 1, with the bottom wall of the housing removed.

As can be seen in FIGS. 1, 2 and 4, the lower portion 13 of the housing 11 has an external flat and includes a wall 14 with an internal shoulder serving as a support for a two-piece annular sealing device 15. The two halves of the sealing device 15 flank the marginal portion of a plate-like panel 16 which is installed in the lower portion 13 of the housing 11 and cooperates with the sealing device 15 to prevent leakage of liquid from the chamber 12 into the space beneath the shoulder of the wall 14. FIG. 1 shows by a phantom line one of several fastening members 116 (e.g., screws) which are used to deform the two-piece sealing device 15 into sealing engagement with the internal surface of the lower portion 13, with the shoulder of the wall 14 and with the marginal portion of the panel 16.

The panel 16 can be said to constitute an intermediate wall in the lower portion 13 of the housing 11 immediately beneath the chamber 12. The space beneath the panel 16 is closed from below by a detachable bottom wall 20 which can be a friction fit in the lower end of the housing portion 13. The fasteners 116 can be designed to connect the sealing device 15, and the panel 16 only to the wall 14, to the bottom wall 20, or to the bottom wall 20 as well as to the wall 14. The bottom wall 20 of FIG. 1 is a flat disc-shaped body which is made of a plastic material and has a short cylindrical extension 21 in the lower end of the housing portion 13. The space between the wall 14 of the lower portion 13 and the bottom wall 20 confines certain electrical and-/or electronic components of the apparatus 10 as well as a casing 64 for a standard thermostat at the underside of the panel 16. The underside of the bottom wall 20 has several discrete legs 22 or a circumferentially complete leg which contacts a supporting surface (e.g., a table top or a counter top) when the apparatus 10 is ready for use, i.e., when the lower portion 13 of the housing 11 no longer extends into the cup 24. When the apparatus 10 is ready for storage, the leg or legs 22 at the underside of the bottom wall 20 rest on the upper side of the bottom wall 26 of the cup 24. The bottom wall 26 has one or more legs 22' which are exposed in each of the two positions of the cup 24. In FIG. 1, the leg or legs 22' are disposed at a level beneath the bottom wall 26 and are assumed to rest on a supporting surface. The same holds true when the cup 24 is moved to the position of FIG. 2 in which the apparatus 10 is ready to brew a relatively small quantity of hot coffee.

The panel 16 serves as a support for an electrically operated heating device 17 here shown as an annular immersion heater which surrounds the open lower end of an upright liquid conveying element 45 in the form of a riser. The panel 16 is preferably made of a material which can be bonded (e.g., welded) to the immersion heater 17. The latter comprises terminals 19 which extend through the panel 16 and into the space beneath the wall 14 of the lower housing portion 13. The terminals 19 extend into an internal projection 19 which is an integral part of the housing portion 13 and further serves as a means for clamping one end of a flexible electric conductor 23 (e.g., a standard electric cable of the type employed in numerous household appliances) so as to prevent accidental extraction of the cable 23 from the housing 11.

The thermostat in the casing 64 at the underside of the panel 16 is of standard design and form part of controls which are installed in the lower portion 13 between the panel 16 and the bottom wall 20. Such controls can include numerous electrical and/or electronic components which regulate the heating action of the heater 17, which control signal lights (not shown), which automatically disconnect the heater 17 from the energy source after elapse of a preselected interval of time and/or perform certain other useful functions.

The apparatus 10 preferably further comprises means for releasably coupling the cup 24 to the housing 11 in order to avoid accidental separation of the cup when such separation is not desired. The coupling means includes a female coupling or detent element 28 at the inner side of an outer tubular wall 54b forming part of the upper portion 54 of the housing 11, and a complementary male coupling or detent element 27 adjacent the rim of the sidewall 25 of the cup 24. The female coupling element 28 can include or constitute a circumferentially complete groove in the internal surface of the outer wall 54b, and the male coupling or detent element 27 can constitute a bead which can snap into the internal groove to releasably but reliably hold the cup 24 in the position of FIG. 1. The detent element 27 can include several (e.g., three) equidistant elastic prongs which are deformable during insertion of the housing portion 13 into or during extraction of this housing portion from the cup 24 but snap into the groove of the female coupling element 28 as soon as the insertion of lower housing portion 13 into the cup 24 is completed. The person in charge of preparing the apparatus 10 for the making of one or two cups of coffee must overcome the resistance of the elastic prongs which constitute or form part of the male coupling element 27 in order to extract the lower portion 13 of the housing 11 from the cup 24 preparatory to moving the detached cup to the position of FIG. 2.

The cup 24 has an integral external handle 59 in the form of an elongated tube which is open at one (lower) end, as at 61, and carries at its other (upper) end a plug 60 which is dimensioned to enter the outlet 38 in the first position of the cup 24 (see FIG. 1).

The upper portion 54 of the housing 11 and the filter assembly (including the parts 31, 32, 51) define an annular second chamber 35 which communicates with the outlet 38 and serves to collect hot beverage which has passed through the filter element 32 of the filter assembly. The sidewall 25 of the cup 24 and the external surface of the lower portion 13 define an annular third chamber 29 which serves to receive convolutions of the electric cable 23 when the apparatus 10 is not in use, i.e., when the lower portion 13 of the housing 11 extends into the cup 24. The dimensions of the third chamber 29 are preferably selected in such a way that this chamber can receive the entire cable 23 with the possible exception of the customary plug (not shown) at the free end of the cable. Extraction of the cable 23 from the space between the panel 16 and the bottom wall 20 is prevented by the clamping device 18 which forms part of or constitutes the internal projection of the housing portion 13.

When the brewing of a metered quantity of coffee is completed, the operator or another person consumes the contents of the cup 24 and cleans the cup preparatory to insertion of the lower portion 13 of the housing 11 into the interior of the cup. Such inserting step is preceded by winding of the cable 23 around the external surface of the housing portion 13 before the portion 13 and the convolutions of the cable 23 are inserted into the cup 24. A first portion of the cable 23 extends into the space beneath the panel 16 through a first opening 65 in the housing portion 13 adjacent the clamping projection 18, a second portion of the cable 23 extends from the housing 11 through an opening 74 above the rim of the cup 24, and a third portion (between the first and second portions) of the cable 24 is convoluted around the lower portion 13 of the housing 11 when the cup 24 is maintained in the (first) position of FIG. 1. This ensures that the cable 23 is out of the way and is at last substantially concealed in the chamber 29 while the apparatus 10 is not in actual use.

The upper portion 54 of the housing 11 includes the aforementioned outer wall 54b and an inner wall 54a which is concentric with the outer wall and carries (at its upper end) a ledge having a supporting surface 30 for the carrier 31 of the filter assembly. The carrier 31 is made of a plastic material (e.g., the same as the material of the housing 11) and has a bottom portion 33 which is integral with and is traversed by a median portion of the riser 45.

The bottom portion 33 of the carrier 31 is provided with an annular channel 42 which receives a sealing element 43 bearing against the supporting surface 30 to prevent leakage of water from the upper end of the chamber 12. The sealing element 43 is deformed by the cover 51 through the medium of the upright cylindrical filter element 32. To this end, the sidewall 52 of the cover 51 has external threads 53 meshing with internal threads 55 in the outer wall 54b of the upper portion 54 of the housing 11. The user can select the force with which the element 43 is deformed into sealing engagement with the supporting surface 30 of the housing 11 and with the surface in the channel 42 by rotating the cover 51 relative to the housing 11 and/or vice versa.

The upper end 46 of the riser 45 is located within the filter element 32 close to the underside of the end wall of the cover 51.

The carrier 31 of the filter assembly defines the annular chamber 35 which surrounds the filter element 32 and permits the hot beverage to flow through a channel 36, over a slope 40 and into the conduit 39, i.e., into and through the outlet 38 and into the cup 24. The chamber 35 is located above the bottom portion 33 of the carrier 31. The outlet 38 is free to discharge hot beverage into the cup 24 when the cup is maintained in the position of FIG. 1, but the outlet 38 is closed (and preferably sealed) by the plug 60 of the handle 59 when the cup 24 is caused to assume the position of FIG. 1. The conduit 39 is part of or constitutes a handle 37 which is open at its upper end 41 and can be grasped by one hand when the person in charge wishes to lift the carrier 31 and the filter element 32 off the supporting surface 30 in order to gain access to the upper end of the chamber 12 as well as to facilitate cleaning of the parts 31 and 32. The carrier 31 can be lifted off the supporting surface 30 subsequent to deactivation of connecting means including the threads 53 and 55, i.e., subsequent to separation of the cover 51 from the upper portion 54 of the housing 11.

The carrier 31 of the filter assembly defines a passage 156 which is located externally of the filter element 32 and receives a pressure relief valve 56. An extension 31a of the carrier 31 overlaps the upper end of the passage 156 and serves as a retainer for a valve spring 58 which biases a spherical valving element 57 against a seat 57a at the lower end of the passage 156. The valving element 57 of the valve 56 is lifted off its seat 57a to permit hot water and steam to flow from the chamber 12 into the chamber 35 when the pressure in the chamber 12 exceeds the pressure in the chamber 35 to a predetermined extent.

The upper end 46 of the riser 45 is provided with a plurality of axial parallel prongs 47 which alternate with slots 48. These slots establish paths for the flow of heated liquid and steam from the chamber 12, through the riser 45 and into the space within the filter element 32. The upper ends of the slots 48 are open and the tips of the prongs 47 are overlapped and surrounded by a detachable cap 50 having one or more internal detent members 49 cooperating with complementary detent members at the outer sides of the prongs 47 in order to close the upper end of the passage within the riser 45 and to ensure that heated liquid and/or steam must flow substantially radially outwardly of the riser and toward the internal surface of the filter element 32.

FIG. 1a shows a modified cap 50 which has a sieve 63 overlying the open upper end of the riser. The sieve 63 permits a certain percentage of ascending hot water and steam to flow toward the underside of the end wall of the cover 51. The remaining liquid enters the chamber 35 by way of the slots which are configured in the same way as in the riser 45 of FIG. 1.

The main purpose of the cap 50 or 50' is to prevent or to reduce the likelihood of penetration of fragments of coffee beans into the riser 45 when the person in charge is in the process of introducing a metered quantity of comminuted coffee beans into the annular space between the upper portion of the riser and the filter element 32. The cap 50 or 50' greatly reduces the likelihood of clogging of the riser 45, particularly of the lower end of the riser, with a flavoring agent.

The filter element 32 of the illustrated apparatus 10 is an upright cylinder which has a set of equidistant windows 44a covered by liquid-permeable screens 44 (e.g., very thin metallic or plastic foils) which permit the hot beverage to flow into the chamber 35 but intercept particles of comminuted coffee beans. The windows 44a are provided in the lower portion of the filter element 32. The lower portion of this filter element extends into an annular recess 34 in the bottom portion 33 of the carrier 31, and the upper portion of the filter element extends into a recess 51a of the cover 50 and bears against a deformable sealing element 51b. A further sealing element can be provided in the recess 34.

The screens or foils 44 are preferably of identical size and shape. These screens permit continuous flow of freshly brewed hot beverage from the interior of the filter element 32 into the annular chamber 35 of the carrier 31. An advantage of the filter element 32 is that it can be reused as often as desired. However, it is equally possible and within the purview of the invention to employ a modified filter assembly wherein the filter element 32 is replaced with a filter element having one or more windows 44a or otherwise configured openings and a standard filter of paper or the like which confines a supply of comminuted coffee beans and is inserted into the modified filter element. The paper filter is discarded after a single use.

Once the person in charge has admitted a requisite quantity of fresh water into the chamber 12, and the carrier 31 has been placed on top of the supporting surface 30 of the housing 11, such person proceeds to position the filter element 32 onto the carrier 31 and to introduce comminuted coffee beans into the properly positioned filter element. The latter can be assembled with the carrier 31 prior to placing of the carrier onto the supporting surface 30. The next step involves the application of the cover 51 which is threadedly connected with the upper portion 54 of the housing 11 (as at 53, 55) to deform the sealing elements 43 and 51b and to thus ensure that heated liquid can leave the chamber 12 only by way of the riser 45 as well as that the freshly brewed beverage can leave the space within the filter element 32 only by way of interstices or pores of the screens or foils 44 to enter the chamber 35 and to flow into the cup 24 (in the position of FIG. 2) by way of the outlet 38.

When the brewing operation is completed, the person in charge detaches the cover 51 from the housing 11 and thereby gains access to the filter element 32 and carrier 31. The parts 31, 32 can be lifted off the supporting surface 30 if the user wishes to brew additional coffee. Thus, the user is then free to admit a metered quantity of liquid into the chamber 12 and to introduce a metered quantity of flavoring agent into the filter element 32, i.e., onto the upper side of the bottom portion 33 of the carrier 31 within the confines of the filter element 32 which is presumed to extend into the recess 34.

The threaded connection 53, 55 between the cover 51 and the housing 11 can be replaced with a bayonet mount or with any other suitable connecting means without departing from the spirit of the invention. This also applies for the separable coupling means 27, 28 between the upper portion 54 of the housing 11 and the cup 24. For example, the connection 53, 55 and/or the coupling means 27, 28 can be replaced with a set of clips, clamps or analogous parts which are capable of preventing unintentional separation of the cover 51 from the housing 11 and/or unintentional separation of the cup 24 from the housing 11. As far as the connection between the cover 51 and the housing 11 is concerned, such connection should be of a nature which enables the operator to ensure that the filter element 32 sealingly engages the cover 51 as well as the carrier 31 and that the carrier sealingly engages the housing 11 in order to confine the liquid to a flow from the chamber 12 into the space within the filter element 32 via riser 45 and to confine the beverage to flow from the space within the filter element into the chamber 35 only via screens or foils 44.

The mode of utilizing the apparatus 10 is as follows:

It is assumed that the cup 24 is maintained in the position of FIG. 1, i.e., that the cup confines a part of the lower portion 13 of the housing 11 and several convolutions of the cable 23 between the openings 65 and 74. If a person wishes to brew one or two cups of coffee, the cover 51 is rotated relative to the housing 11 to disengage its threads 53 from the threads 55 of the upper portion 54. The next step involves lifting of the carrier 31 and filter element 32 off the supporting surface 30 so that the upper end of the chamber 12 become accessible for admission of a metered or unmetered quantity of fresh water. The person in charge thereupon introduces a selected quantity of comminuted coffee beans into the space within the filter element 32 (above the bottom portion 33 of the carrier 31) and the carrier 31 is placed back onto the supporting surface 30 so that the lower portion of the riser 45 (which is integral with the carrier) dips into the body of fresh water in the chamber 12.

If the filter element 32 of FIG. 1 is replaced with a slotted or otherwise apertured filter element which does not carry the screens 44, the person in charge employs a filter bag of paper or the like to introduce a selected quantity of comminuted coffee beans into the modified filter element whereby the filter paper prevents escape of comminuted coffee beans through the apertured filter element and into the chamber 35 of the carrier 31.

When the reattachment of the filter assembly to the housing 11 is completed, i.e., when the chamber 12 contains a supply of fresh water, the filter element 32 confines a quantity of comminuted coffee beans, and the cover 51 is reattached to the upper portion 54 of the housing 11, the operator can detach the cup 22 from the lower portion 13 of the housing and the cup is then caused to assume the position of FIG. 2. Of course, the cup 24 is detached from the housing 11 during an earlier stage of preparation for a brewing operation if it is to be used as a means for admitting fresh water into the chamber 12.

The operator then actuates the controls to complete the circuit of the heater 17 so that the temperature of water in the chamber 12 rises. To this end, the operator actuates a standard on/off switch (not shown) which is mounted on the housing 11 and is accessible at least when the cup 24 is detached from the lower portion 13 of the housing 11. As the temperature of water in the chamber 12 rises, the upper portion of this chamber is filled with steam and the pressure of steam increases in response to continued heating so that a column of hot water ascends in the riser 45 and overflows into the interior of the filter element 32 through the unobstructed portions of slots 49 in the upper end 46 of the riser.

The illustrated apparatus 10 is assumed to be a coffee maker. Therefore, the riser 45 is provided with an aperture 75 which is closely adjacent the underside of the bottom portion 33 of the carrier 31 and serves to permit return flow of steam from the riser 45 into the upper portion of the chamber 12.

Hot water which overflows through the slots 48 of the riser 45 contacts the supply of comminuted coffee beans in the filter element 32 and the thus obtained hot beverage flows through the pores or interstices of the screens 44 to gather in the chamber 35 at the outer side of the filter element. The hot beverage leaves the chamber 35 via passage 36 to enter the conduit 39 of the handle 37 and to flow into the cup 22 via outlet 38. The illustrated cup 24 is assumed to hold a relatively small quantity of hot coffee, e.g., the amount corresponding to that receivable in two standard coffee cups.

The brewing operation is completed within a very short interval of time because the pressure in the chamber 12 is sufficiently high to drive the heated liquid through the riser 45 and thereupon through the screens 44 in the windows 44a of the filter element 32. Proper sealing of the chamber 12 and of the space within the filter element 32 contributes to a shortening of the interval of time which is required to complete the brewing of a relatively small quantity of coffee.

The apparatus 10 of FIGS. 1 to 4 can be furnished with two caps, namely a cap 50 of the type shown in FIG. 1 and a cap 50' of the type shown in FIG. 1a.

FIG. 1 shows that the lower portion 62 of the annular chamber 29 extends all the way to the detachable bottom wall 20. This provides ample room for numerous convolutions of the cable 23 even if the outer diameter of the lower portion 13 of the housing 11 is relatively small.

Figure 5:
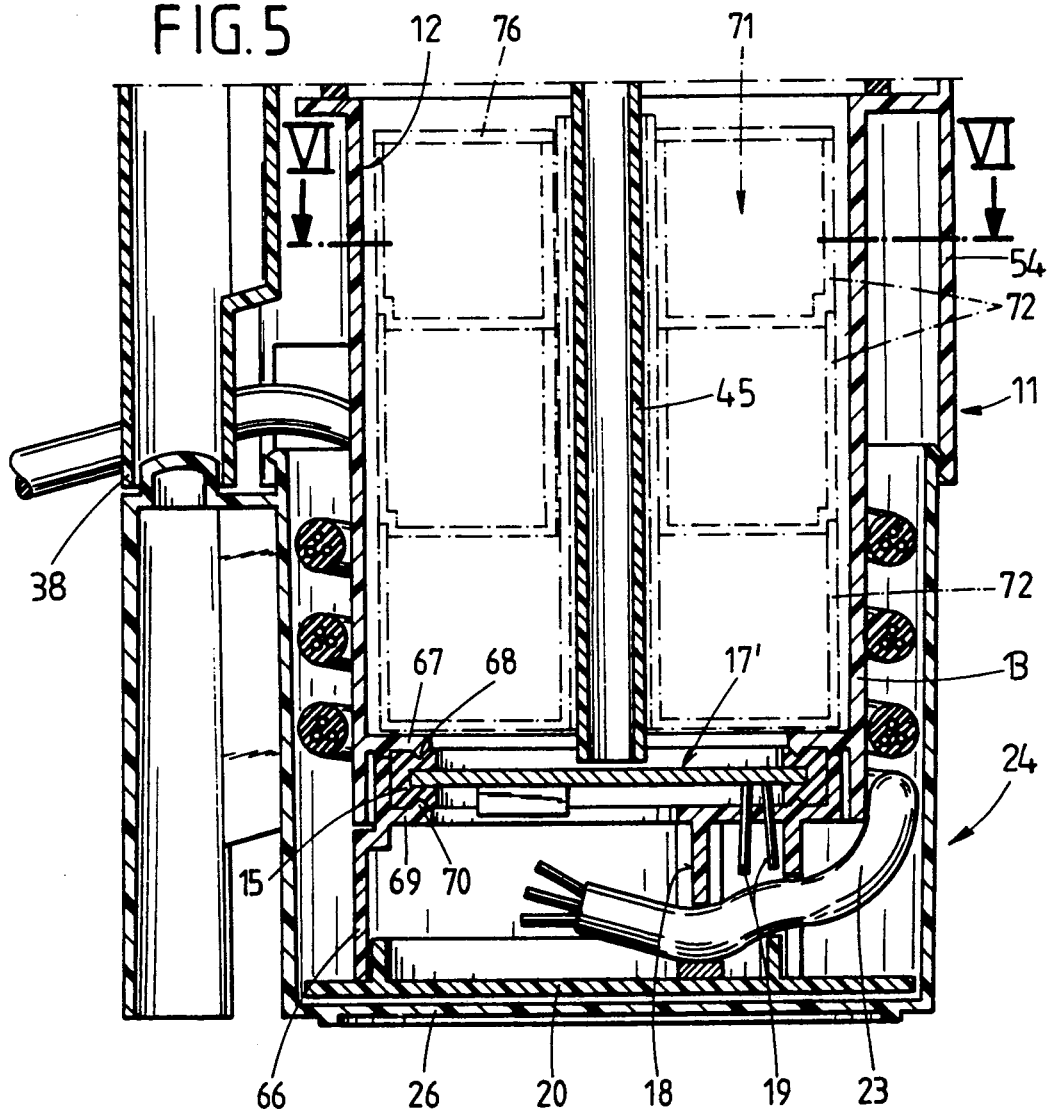
FIG. 5 is a fragmentary central vertical sectional view of a third apparatus, several receptacles for certain ingredients of a hot beverage being indicated by phantom lines.

FIG. 5 shows a portion of an apparatus wherein the upper portion 54 of the housing 11 and the filter assembly (not shown) are identical with the corresponding parts of the apparatus of FIGS. 1 to 4. The lower portion 13 of the housing 11 is mounted on top of a hollow base 66 which cooperates with the lower portion 13 to deform an annular sealing member 15 which is or can be bonded to the adjacent surfaces of the parts 13 and 66. Furthermore, the lower portion 13 and the base 66 are provided with confronting annular ribs or beads 68, 70 which engage and deform the sealing member 15 to prevent the escape of liquid from the annular chamber 12 above an electric heater 17'. The marginal portion of this heater is sealingly engaged by the adjacent annular portions of the deformed sealing member 15. The sealing member 15 is installed between an inwardly extending annular flange 67 which forms an integral part of the lower portion 13 and carries the rib 68, and an inwardly extending annular flange 69 which forms part of the base 66 and carries the rib 70. The base 66 can constitute or resemble an upright cylinder which is coaxial with the lower portion 13 of the housing 11.

The heater 17 of FIG. 5 employs one or more thick film conductors (not shown), e.g., thick film conductors of the type disclosed in commonly owned U.S. Pat. Nos. 4,765,422, 4,888,465, 4,888,466, 4,888,467 and 4,920,868 to which reference may be had, if necessary. The thick film conductor or conductors are applied to that side of the plate-like support of the heater 17' of FIG. 5 which faces the chamber 12. The terminals 19 of the thick film conductor or conductors extend into the interior of the base 66 (which is a separately produced part and is bolted to or otherwise connected to the lower portion 13 of the housing 11) and are electrically connected with an energy source when the apparatus of FIG. 5 is ready for use.

The open underside of the base 66 is closed by a bottom wall 20 which is or can be similar or identical to the bottom wall 20 of the apparatus 10 which is shown in FIG. 1. The hollow base 66 accommodates additional electrical and/or electronic components (not shown) which form no part of the present invention.

The only real difference between the apparatus 10 of FIG. 1 and the apparatus of FIG. 5 is that the means for heating the supply of liquid in the chamber 12 is not an electric resistance heater (immersion heater) but rather a heater 17' which employs one or more thick film conductors. The pressure in the chamber 12 rises when the heater 17' of FIG. 5 is on to thus ensure rapid accumulation of a desired quantity of hot beverage in the cup 24 which is then detached from the housing 11 and is positioned in a manner as shown in FIG. 2, i.e., to intercept and collect the hot beverage issuing via outlet 38.

FIG. 5 further shows that the housing 11 (and more particularly the chamber 12) can be used for storage of one or more receptacles 71 which serve to confine milk, sugar, artificial sweetener, comminuted coffee beans, fragments of tea leaves or any other additives or accessories which are needed in connection with the brewing and consumption of hot beverages. FIG. 5 shows (by phantom lines) three superimposed annular receptacles 71 each of which can contain a different substance. For example, one of the receptacles 71 can be used for storage of milk or milk powder, the other of these receptacles can be used for storage of comminuted coffee beans or tea leaves, and the third receptacle 71 can serve for storage of a sweetener, e.g., sugar and/or an artificial sweetening agent. The receptacles 71 are stacked on top of each other and can be form-lockingly secured to one another in a manner as shown at 72. These receptacles are removed from the chamber 12 preparatory to admission of a metered quantity of fresh water (if the apparatus of FIG. 5 is used for the brewing of hot coffee or hot tea). Each receptacle 71 has a centrally located opening for a portion of the riser 45. The arrangement is preferably such that the receptacles 71 at least substantially fill the chamber 12 when the apparatus is not in use. This renders it possible to store a relatively large quantity of coffee, tea, milk and/or sugar or artificial sweetener. The receptacles 71 may but need not be of identical size and/or shape.

The form-locking connections between neighboring (superimposed) receptacles 71 in the chamber 12 of FIG. 5 can be achieved by providing the bottom wall of each receptacle 71 with a marginal notch which receives a raised rim of the receptacle below it. Each receptacle 71 (with the possible exception of the topmost receptacle) can have an open top which is sealed by the bottom wall of the receptacle above it. The receptacles 71 can be held against angular movement relative to each other if the bottom wall of each receptacle has two or more discrete recesses for discrete projections of the receptacle below it.

The form-locking connections 72 can be altered in a number of ways. For example, the recesses can be provided in the rims of sidewalls of the receptacles 71 to receive projections extending downwardly from the bottom walls of receptacles above the rims.

The cover 76 for the uppermost receptacle 71 of FIG. 5 can constitute a flat disc which can be provided with a handle (not shown) to facilitate lifting of the cover 76 above and away from the uppermost receptacle 71.

Each receptacle 71 preferably contains a single substance.

The utilization of packed (metered) quantities of milk, sugar, tea, coffee, etc. in the receptacles 71 is preferred at this time because the contents of such packages can be stored for long periods of time without risking contamination, spoilage or loss of aroma. Packages which contain metered quantities of powdered milk, sugar, coffee, etc. are readily available on the market and are in widespread use on aircraft, in hotels, in motels and in many other establishments.

Figure 6:
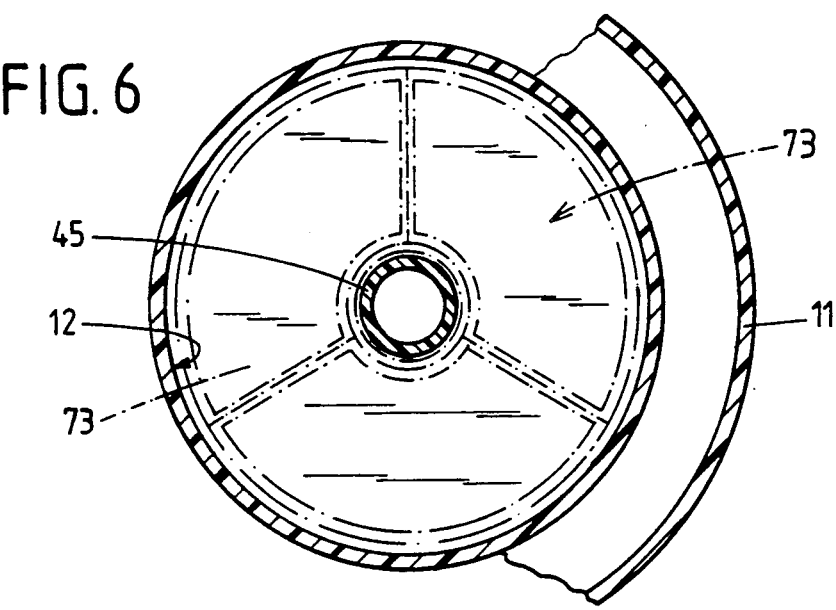
FIG. 6 is a fragmentary horizontal sectional view substantially as seen in the direction of arrows from the line VI—VI of FIG. 5 but showing three different receptacles in the liquid-receiving chamber around the riser.

FIG. 6 shows that the annular receptacles 71 of FIG. 5 can be replaced with sector-shaped receptacles 73 which at least substantially fill the chamber 12 and each of which can extend along an arc of 120° (as seen in the circumferential direction of the riser 45).

The upper ends of the receptacles 73 are or can be open, and the apparatus which embodies the structure of FIG. 6 then further comprises a cover (corresponding to the cover 76 of FIG. 5) which overlies the open tops of all three receptacles 73. Each receptacle 73 can extend from the lowermost portion to the topmost portion of the chamber 12. Furthermore, instead of employing a single annular cover 76 for all three receptacles 73, one can provide a discrete cover for each of the three illustrated receptacles 73.

It is clear that each receptacle 71 of FIG. 5 can be replaced with two, three or more sector-shaped receptacles of the type shown in FIG. 6. This depends on the desired number of receptacles.

The substances which are to be stored in the receptacles 71 or 73 can be simply poured into the respective receptacles. However, it is presently preferred to fill these receptacles with individually packaged metered quantities of comminuted coffee beans, fragments of tea leaves, milk, sugar or an artificial sweetener. These substances can be furnished in packets or packages of desired size and/or shape in order to ensure that the user can select the desired quantity of each substance for the brewing of a hot beverage as well as for subsequent addition of milk and/or sugar or artificial sweetener. For example, each packet which confines comminuted coffee beans can contain a quantity which is required to brew one cup of coffee. This facilitates the task of the person in charge of brewing because such person merely reads the information on the packages or packets in order to ascertain that quantity or those quantities which are best suited for the brewing of a satisfactory hot beverage. Packets for milk preferably contain pulverulent milk or a pulverulent substitute for milk. Each receptacle 73 preferably contains a single substance.

It is further possible to use one of the receptacles 73 as a means for storing miniature or even relatively large spoons and/or other devices which can be used to stir the contents of the cup 24 and/or to introduce into the cup a metered quantity of sugar or milk.

An advantage of the receptacles 73 is that the contents of all three receptacles are visible and accessible as soon as the cover 76 is lifted.

The improved apparatus is susceptible of many additional modifications without departing from the spirit of the invention. For example, and as already mentioned above, the threaded connection 52, 55 between the cover 51 of the filter assembly 31+32+51 and the upper portion 54 of the housing 11 can be replaced with a bayonet mount, with clips or clamps or with any other suitable means which can ensure satisfactory sealing engagement between the carrier 31 and the filter element 32, between the filter element 32 and the cover 51, as well as between the carrier 31 and the supporting surface 30. The same applies for the coupling means 27, 28 between the cup 24 and the lower portion 13 of the housing 11. The filter element 32 can be replaced with a simpler filter element which does not employ liquid-permeable screens 44 if the filter element is designed to receive a filter bag which can contain a desired quantity of flavoring agent and is normally discarded after a single use. It is also possible to depart from the illustrated configuration of the housing 11 and/or filter assembly and/or cup 24.

The improved apparatus exhibits a number of important advantages. Thus, at least the major part of the cable 23 can be concealed within the apparatus by the simple expedient of designing the housing 11 and the cup 24 in such a way that these parts define an annular chamber (29) when the cup is held in the position in FIG. 1 or 5 in which the wall 25 of the cup 24 is spaced apart from and surrounds the lower portion 13 of the housing 11. Moreover, the apparatus can rapidly brew a selected quantity of hot beverage because the liquid in the apparatus is under pressure as soon as the heater 17 or 17' is turned on to raise the temperature of liquid in the chamber 12. The rate of brewing can be increased by the simple expedient of airtightly sealing the chamber 12 and the space within the filter element 32 from the atmosphere. As the pressure in the chamber 12 rises, heated liquid is forced to rapidly flow up the riser 45 and to thereupon contact the flavoring agent within the filter element 32 prior to leaving the interior of the filter element through the screens 44 to accumulate in the chamber 35 and to be compelled to enter the cup 24 by gravity flow.

Since the lower portion 13 of the housing 11 extends into the cup 24 when the apparatus is not in use, the length of the apparatus in the position of the cup 24 as shown in FIG. 1 is not excessive, i.e., such collapsed apparatus can be readily stored, with many other things, in a travelling bag, suitcase or the like. Moreover, the coupling means 27, 28 and the connecting means 53, 55 prevent unintentional separation of the corresponding parts when the apparatus is not in actual use. The overall height of the collapsed apparatus can be reduced still further by increasing the diameters of the housing 11 and cup 24 while reducing the height of the chamber 12. It has been found that partial encapsulation of the housing 11 in the cup 24 when the latter is not in use results in significant changes of the space requirements of the apparatus when the apparatus is collapsed so that the lower portion 13 of the housing 11 extends into the cup 24. At the same time, the cup 24 cooperates with the lower portion 13 to shield, confine and conceal the convoluted cable 23. It is presently preferred to select the length and the diameter of the cable 23, as well as the axial length and the width of the annular chamber 29, in such a way that at least the major part of the cable can be convoluted around the external surface of the lower portion 13 preparatory to introduction of this lower portion into the cup 24. Thus, only the non-illustrated plug of the cable 23 can be left outside of the housing 11 and cup 24, e.g., immediately adjacent the opening 74 in the housing 11.

The coupling means 27, 28 between the cup 24 and upper section 54 of the housing 11 can be modified in a number of ways as long as it ensures adequate retention of the cup 24 in the position of FIG. 1. It has been found that, in most instances, three uniformly spaced apart identical male coupling elements on the wall 25 or 54a (as seen in the circumferential direction of these walls) suffice to reliably retain the cup 24 in the position of FIG. 1. The illustrated coupling means 27, 28 preferably form integral parts of the respective walls 25 and 54b.

The relief valve 56 constitutes a desirable but optional feature of the improved apparatus.

The apparatus can be provided with means for releasably locking the cover 76 to the topmost receptacle 72 of FIG. 5 or to the upper end portions of the receptacles 73 which are shown in FIG. 6. Such locking is not very important if the contents of the receptacles 71 and 73 are individually packed instead of being simply poured into the respective receptacles. As a rule, it suffices to provide the receptacles 71 with marginal recesses for the adjacent marginal portion of the preferably disc-shaped cover 76. The cover can be recessed into the upper end portions of the containers 73 in an analogous manner.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. A portable apparatus for brewing hot beverages, comprising a housing having a liquid-receiving first chamber; a liquid-permeable filter assembly arranged to confine a supply of flavoring agent, said filter assembly being provided in said housing and defining a beverage-receiving second chamber having an outlet; electrically operated means for heating the liquid in said first chamber; means for conveying heated liquid from said first chamber into contact with flavoring agent in said filter assembly and attendant conversion into hot beverage which gathers in said second chamber; a vessel movable relative to said housing between a first position in which said housing extends into said vessel and a second position in which said vessel receives hot beverage from the second chamber by way of said outlet., said vessel and said housing defining a third chamber in the first position of said vessel; and an electric conductor connected with said heating means in said housing, extending from said housing and being receivable in said third chamber in the first position of said vessel.

2. The apparatus of claim 1, wherein said housing includes an upper portion arranged to carry said filter assembly and a lower portion for said heating means, said lower portion extending into said vessel in the first position of said vessel.

3. The apparatus of claim 1, wherein said filter assembly comprises a cover; means for separably connecting said cover to said housing, and a filter element between said cover and said housing.

4. The apparatus of claim 1, wherein said third chamber is an annular chamber and is dimensioned to receive convolutions of said conductor, such convolutions surrounding said housing and being surrounded by said vessel in the first position of said vessel.

5. The apparatus of claim 1, wherein said filter assembly is disposed above said first chamber in the first as well as in the second position of said vessel.

6. The apparatus of claim 1, wherein said housing has a lower portion with a first opening and said housing has a second opening above said vessel in either position of said vessel, said conductor having a first portion extending into the lower portion of said housing by way of said first opening and a second portion extending outwardly through said second opening.

7. The apparatus of claim 6, wherein said conductor further includes a third portion which is disposed between said first and second portions and is convoluted around said lower portion within said third chamber in the first position of said vessel.

8. The apparatus of claim 1, wherein said housing includes a lower portion which extends into said vessel in the first position of said vessel and an upper portion, said upper portion having first coupling means and said vessel having second coupling means releasably engaging said first coupling means in the first position of said vessel.

9. The apparatus of claim 8, wherein said upper portion has an inner wall and an outer wall surrounding said inner wall, said first coupling means being provided on said outer wall.

10. The apparatus of claim 1, wherein said housing has an upper portion and a lower portion, said lower portion extending into said vessel in the first position of said vessel and said upper portion having a supporting surface, said filter assembly including a filter element and a carrier for said filter element, said carrier sealingly engaging said supporting surface and said second chamber constituting an annulus which surrounds said filter element.

11. The apparatus of claim 10, wherein said conveying means includes a riser having an open lower end in said first chamber and an upper end within said filter element.

12. The apparatus of claim 11, wherein said carrier has a sealing element which engages said supporting surface and said riser extends through said carrier, said filter assembly further comprising a conduit which receives hot beverage from said second chamber and defines said outlet.

13. The apparatus of claim 1, wherein said filter assembly comprises a conduit defining said outlet, said vessel having a handle having a plug extending into said outlet in the first position of said vessel.

14. The apparatus of claim 1, wherein said filter assembly defines a passage connecting said first and second chambers and further comprising a relief valve installed in said passage and being operative to permit the flow of heated liquid from said first chamber into said second chamber when the pressure in said first chamber exceeds the pressure in said second chamber to a predetermined extent.

15. The apparatus of claim 14, wherein said filter assembly comprises an annular filter element and said relief valve is located outside of said filter element.

16. The apparatus of claim 14, wherein said filter assembly comprises a filter element and a carrier for said filter element, said passage being defined by said carrier and said carrier having an extension overlying said passage, said valve including a seat in said carrier, a valving element in said passage and a valve spring reacting against said extension and bearing upon said valving element to bias said valving element against said seat.

17. The apparatus of claim 1, wherein said conveying means includes a riser having a lower end in said first chamber and an upper end in said filter assembly, said upper end having prongs and slots alternating with said prongs and defining paths for the flow of heated liquid from said first chamber into said second chamber.

18. The apparatus of claim 17, further comprising a cap overlying said upper end and means for separably coupling said cap to said prongs.

19. The apparatus of claim 17, further comprising a sieve overlying the upper end of said riser.

20. The apparatus of claim 1, wherein said filter assembly includes a hollow upright cylinder having an upper portion and a lower portion, at least one window below said upper portion and a liquid-permeable screen overlapping said at least one window, said filter assembly further comprising a carrier installed in said housing and having an annular recess for the lower portion of said cylinder, and a cover overlying and sealingly engaging the upper portion of said cylinder.

21. The apparatus of claim 20, further comprising a sealing element engaging the upper portion of said cylinder and extending into a recess of said cover.

22. The apparatus of claim 20, wherein said screen is a liquid-permeable foil.

23. The apparatus of claim 20, wherein said cylinder has a plurality of windows and a liquid-permeable screen in each of said windows, said screens being of identical size and shape.

24. The apparatus of claim 1, wherein said housing comprises an upper portion and a lower portion, said filter assembly comprising a carrier on said upper portion, a filter element on said carrier, and a cover overlying said filter element, said cover and said upper portion having mating threads to clamp said filter element and said carrier between said cover and said housing.

25. The apparatus of claim 24, wherein said cover is cup-shaped and has a sidewall extending into said upper portion, said threads including external threads on said sidewall and internal threads in said upper portion.

26. The apparatus of claim 1, wherein said housing includes an upper portion and a lower portion, said lower portion having a wall beneath said first chamber and further comprising a panel provided in said first chamber and sealing means interposed between said wall and said panel, said heating means being mounted on said panel.

27. The apparatus of claim 26, wherein said heating means has electric terminals extending through said panel and into said lower portion beneath said wall.

28. The apparatus of claim 26, wherein said wall defines an internal shoulder for said sealing means and further comprising means for fastening said panel to said lower portion so as to deform said sealing means into sealing engagement with said panel and said shoulder and to thus prevent escape of liquid from said first chamber along said shoulder.

29. The apparatus of claim 1, wherein said heating means includes an annular electric immersion heater in said first chamber, said conveying means including a riser having an open lower end extending into said first chamber and being surrounded by said heater.

30. The apparatus of claim 29, further comprising a panel bonded to said heater and installed in said first chamber.

31. The apparatus of claim 1, wherein said housing includes an upper portion which carries said filter assembly, a lower portion which defines said first chamber, and a hollow base beneath said lower portion, and further comprising annular sealing means between said base and said lower portion, said heating means including at least one thick film conductor in said base.

32. The apparatus of claim 31, wherein said lower portion at least partially surrounds said base and said sealing means is bonded to said lower portion and said base.

33. The apparatus of claim 31, wherein said base and said lower portion have confronting substantially annular ribs and said sealing means is clamped between said ribs.

34. The apparatus of claim 1, further comprising a panel disposed in said first chamber and mounting said heating means, said housing having a space beneath said panel and further comprising a thermostat mounted on said panel and located in said space.

35. The apparatus of claim 1, wherein said first chamber is accessible for temporary storage of accessories for the preparation of hot beverages.

36. The apparatus of claim 35, wherein said accessories include sweeteners, milk and coffee or tea.

37. The apparatus of claim 1, wherein said conveying means comprises a riser in said first chamber and further comprising a plurality of substantially annular receptacles removably installed in said first chamber and surrounding said riser.

38. The apparatus of claim 37, wherein said receptacles are stacked on top of each other.

39. The apparatus of claim 37, wherein said receptacles are form-lockingly connected to each other and at least substantially fill said first chamber.

40. The apparatus of claim 1, wherein said conveying means includes a riser in said first chamber and further comprising a plurality of substantially sector-shaped receptacles removably installed in said first chamber and at least partially surrounding said riser.

41. The apparatus of claim 40, wherein said receptacles are of identical size and shape and the total number of said receptacles exceeds two.

* * * * *